US012481697B2

(12) United States Patent
Gao et al.

(10) Patent No.: US 12,481,697 B2
(45) Date of Patent: Nov. 25, 2025

(54) AUDIO PLAYING METHOD, ELECTRONIC DEVICE, AND STORAGE MEDIUM

(71) Applicant: NETEASE (HANGZHOU) NETWORK CO., LTD., Zhejiang (CN)

(72) Inventors: Xiang Gao, Zhejiang (CN); Jing Sun, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 390 days.

(21) Appl. No.: 17/663,225

(22) Filed: May 13, 2022

(65) Prior Publication Data

US 2022/0269724 A1 Aug. 25, 2022

Related U.S. Application Data

(63) Continuation of application No. PCT/CN2020/097534, filed on Jun. 22, 2020.

(30) Foreign Application Priority Data

Nov. 14, 2019 (CN) .......................... 201911112611.4
Jan. 15, 2020 (CN) .......................... 202010042918.8

(51) Int. Cl.
*G06F 16/683* (2019.01)
*G06F 16/68* (2019.01)
(Continued)

(52) U.S. Cl.
CPC .......... *G06F 16/685* (2019.01); *G06F 16/686* (2019.01); *G06F 40/289* (2020.01); *G10L 13/08* (2013.01); *G10L 2013/083* (2013.01)

(58) Field of Classification Search
CPC .... G06F 16/685; G06F 16/686; G06F 40/289; G06F 16/63; G06F 16/68; G10L 13/08; G10L 2013/083; G10L 15/26; G11B 27/10
See application file for complete search history.

(56) References Cited

U.S. PATENT DOCUMENTS 6,865,431 B1 * 3/2005 Hirota ...................... G11C 7/16
713/193
2002/0091713 A1 * 7/2002 Walker .................. G06F 40/211
(Continued)

FOREIGN PATENT DOCUMENTS

CN 102497391 A 6/2012
CN 104038827 A 9/2014
(Continued)

OTHER PUBLICATIONS

International Search Report dated Sep. 1, 2020 for PCT international application No. PCT/CN2020/097534.
(Continued)

*Primary Examiner* — Linda Wong
(74) *Attorney, Agent, or Firm* — Qinghong Xu

(57) ABSTRACT

The present application provides an audio playing method, an electronic device, and a computer readable storage medium. The method comprises: recognizing an audio file to be played as a text file containing sentence segmentation symbols; generating respective sentence segmentation tags at positions corresponding to the sentence segmentation symbols in the audio file, according to a correspondence relationship between the audio file and the text file; in response to a trigger operation, determining a target play point according to a current play position of the audio file and respective positions of the sentence segmentation tags; and playing the audio file from the target play point.

20 Claims, 7 Drawing Sheets

(51) Int. Cl.
*G06F 40/289* (2020.01)
*G10L 13/08* (2013.01)

(56) References Cited

U.S. PATENT DOCUMENTS

| | | | | |
|---|---|---|---|---|
| 2008/0140652 | A1* | 6/2008 | Millman | G06F 16/34 |
| 2010/0305726 | A1* | 12/2010 | Lu | G06F 3/0481 |
| | | | | 700/94 |
| 2012/0310642 | A1* | 12/2012 | Cao | G10L 13/00 |
| | | | | 704/235 |
| 2016/0328104 | A1* | 11/2016 | Chandra | G06F 16/7834 |
| 2021/0327420 | A1* | 10/2021 | Aher | G10L 15/22 |

FOREIGN PATENT DOCUMENTS

| | | | |
|---|---|---|---|
| CN | 104965872 | A | 10/2015 |
| CN | 106373598 | A | 2/2017 |
| CN | 107679033 | A | 2/2018 |
| CN | 108268452 | A | 7/2018 |
| CN | 108989897 | A | 12/2018 |
| CN | 109246472 | A | 1/2019 |
| WO | 2019144926 | A1 | 8/2019 |
| WO | 2019153685 | A1 | 8/2019 |

OTHER PUBLICATIONS

The 1st Office Action dated Feb. 7, 2021 for CN patent application No. 202010042918.8.
The 2nd Office Action dated May 13, 2021 for CN patent application No. 202010042918.8.

* cited by examiner

AUDIO PLAYING METHOD, ELECTRONIC DEVICE, AND STORAGE MEDIUM

CROSS-REFERENCE TO RELATED APPLICATIONS

The present disclosure is a continuation of International Application No. PCT/CN2020/097534, filed on Jun. 22, 2020, which is based on and claims priorities to Chinese Patent Application No. 201911112611.4, filed with the Chinese Patent Office on Nov. 14, 2019, titled 'AUDIO PLAYING METHOD AND APPARATUS, STORAGE MEDIUM AND ELECTRONIC DEVICE', and Chinese Patent Application No. 202010042918.8, filed with the Chinese Patent Office on Jan. 15, 2020, titled 'AUDIO PLAYING METHOD, ELECTRONIC DEVICE AND STORAGE MEDIUM', which are incorporated herein by reference in their entireties for all purposes.

TECHNICAL FIELD

The present disclosure relates to the field of audio technology, and in particular, to an audio playing method, an electronic device, and a storage medium.

BACKGROUND

With the development of communication technology, most terminals currently support the audio play to meet the needs of users for study, work and entertainment.

In some cases, a specific audio segment needs to be played repeatedly. For example, a certain segment of audio needs to be re-listened for learning or interest reasons, or it is necessary to return to the position of the certain segment of audio for re-listening because the play content cannot be heard clearly. However, the existing technology used to realize this function of playback has problems such as inaccurate positioning, high operation cost, low efficiency, fixed return time is not the time required by the user, and low flexibility and accuracy.

It should be noted that the information disclosed in the above Background Section is only for enhancement of understanding of the background of the present disclosure, and therefore may contain information that does not form the prior art that is already known to a person of ordinary skill in the art.

SUMMARY

According to an aspect of the present disclosure, there is provided an audio playing method. The audio playing method may include: recognizing an audio file to be played as a text file containing sentence segmentation symbols; generating respective sentence segmentation tags at positions corresponding to the sentence segmentation symbols in the audio file according to a correspondence relationship between the audio file and the text file; in response to a trigger operation, determining a target play point according to a current play position of the audio file and respective positions of the sentence segmentation tags; and playing the audio file from the target play point.

According to another aspect of the present disclosure, there is provided an audio playing method. The audio playing method may include: in response to a second trigger operation, detecting whether a speech rate of an audio file to be played is less than a preset speech rate; in response to detecting the speech rate of the audio file to be played is less than the preset speech rate, recognizing the audio file to be played as a text file containing sentence segmentation symbols; generating respective sentence segmentation tags at positions corresponding to the sentence segmentation symbols in the audio file according to a correspondence relationship between the audio file and the text file; in response to detecting the speech rate of the audio file to be played is greater than or equal to the preset speech rate, generating a corresponding sentence segmentation tag in the audio file according to an audio pause duration; in response to a first trigger operation, determining a target play point according to a current play position of the audio file and respective positions of the sentence segmentation tags; and playing the audio file from the target play point.

According to another aspect of the present disclosure, there is provided an electronic device. The electronic device may include: a processor and a display component; and memory configured to store instructions executable by the processor; wherein the processor is configured to recognize an audio file to be played as a text file containing sentence segmentation symbols; generate respective sentence segmentation tags at positions corresponding to the sentence segmentation symbols in the audio file according to a correspondence relationship between the audio file and the text file; in response to a trigger operation, determine a target play point according to a current play position of the audio file and respective positions of the sentence segmentation tags; and play the audio file from the target play point.

BRIEF DESCRIPTION OF THE DRAWINGS

The above and other features and advantages of the present disclosure will become more apparent from the detailed description of exemplary embodiments thereof with reference to the accompanying drawings. Obviously, the drawings in the following description are only some embodiments of the present disclosure, and for those of ordinary skill in the art, other drawings can also be obtained from these drawings without creative effort.

DETAILED DESCRIPTION

Figure 1:
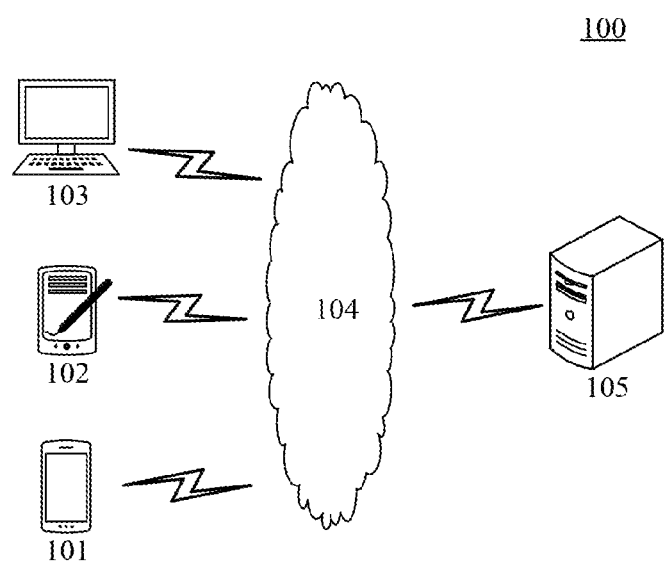
FIG. 1 is a schematic diagram of a system architecture of an audio playing method according to some embodiments of the disclosure.

It should be noted that the embodiments of the present disclosure and the features of the embodiments may be combined with each other under the condition of no conflict. The present disclosure will be described in detail below with reference to the accompanying drawings and in conjunction with embodiments.

In order to make those skilled in the art better understand the solutions of the present disclosure, the technical solutions in the embodiments of the present disclosure will be clearly and completely described below with reference to the accompanying drawings in the embodiments of the present disclosure. Obviously, the described embodiments are only part of the present disclosure, but not all of the embodiments. Based on the embodiments in the present disclosure, all other embodiments obtained by persons of ordinary skill in the art without creative efforts shall fall within the protection scope of the present disclosure.

It should be noted that the terms 'first', 'second' and the like in the description and claims of the present disclosure and the above drawings are used to distinguish similar objects, and are not necessarily used to describe a specific sequence or order. It is to be understood that the data used in this way are interchangeable under appropriate circumstances, to implement the embodiments of the present disclosure described herein. Furthermore, the terms 'comprising' and 'having' and any variations thereof, are intended to cover non-exclusive inclusion, for example, processes, methods, systems, products or devices comprising a series of steps or units is not necessarily limited to those expressly listed, and those steps or units may include other steps or units not expressly listed or inherent to these processes, methods, products or devices.

It should be noted that the accompanying drawings are only schematic illustrations of the present disclosure, and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

During the long-term research and development process, the inventor of the present disclosure found that the audio playing method in the prior art has the following deficiencies:

1. When sliding the audio playing progress bar through a gesture to return, it can only rely on the user's feeling to slide, which often requires the user to slide multiple times to locate the appropriate play position, which is inefficient and has a low user experience;
2. By recognizing the audio pause duration and returning to the preceding audio pause for playing, the user's operational burden can be reduced to a certain extent, but this method is often prone to misrecognition, especially when the audio play speed is slow and the audio pause cannot be accurately identified, and the user cannot accurately locate the beginning of the sentence that the user wants to re-listen to playback. In addition, the recognition method of audio pauses cannot be adjusted in a targeted manner according to the speech rate environment of the playing, and intelligent sentence segmentation cannot be realized.
3. Every time a sentence is played during the audio playing process, if the user wants to re-listen to the content of the preceding sentence, the playing progress bar is often played to the beginning of the next sentence. At this time, if it is located at the preceding pause in the audio, it is not the content that user want to listen to, so the return operation is also need to repeat, which is cumbersome.

In order to solve the above problems, the present embodiment provides a new technical solution, and technical solutions of the embodiments of the present disclosure are described in detail below.

FIG. 1 shows a schematic diagram of a system architecture of an exemplary application environment to which an audio playing method according to some embodiments of the present disclosure can be applied.

As shown in FIG. 1, the system architecture 100 may include one or more of terminal devices 101, 102, 103, a network 104 and a server 105. The network 104 is a medium used to provide a communication link between the terminal devices 101, 102, 103 and the server 105. The network 104 may include various connection types, such as wired communication links, wireless communication links, or fiber optic cables, and so on. The terminal devices 101, 102, 103 may be various electronic devices with display screens, including but not limited to desktop computers, portable computers, smart phones, tablet computers, and the like. It should be understood that the numbers of terminal devices, networks and servers in FIG. 1 are merely illustrative. There can be any number of terminal devices, networks and servers according to implementation needs. For example, the server 105 may be a server cluster composed of multiple servers, or the like.

The audio playing method provided by the embodiments of the present disclosure may be executed by the terminal devices 101, 102, and 103, and correspondingly, the audio playing apparatus may also be provided in the terminal devices 101, 102, and 103. The audio playing method provided by the embodiments of the present disclosure may also be jointly executed by the terminal devices 101, 102, and 103 and the server 105. In addition, the audio playing method provided by the embodiments of the present disclosure may also be executed by the server 105, and correspondingly, the audio playing apparatus may be set in the server 105, which is not particularly limited in this exemplary embodiment.

Figure 2:
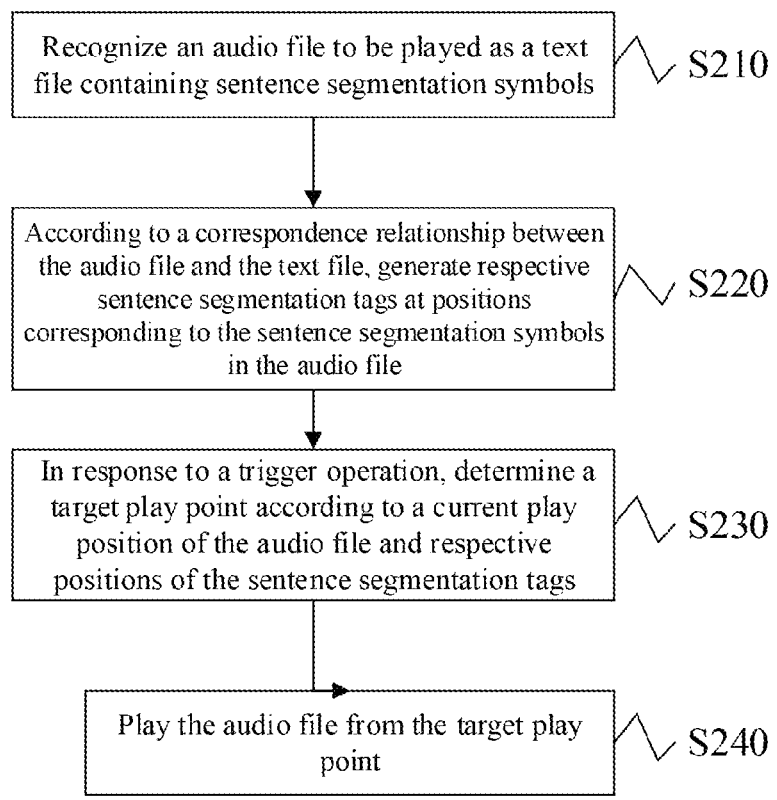
FIG. 2 is a flowchart of an audio playing method according to some embodiments of the disclosure.

An aspect of the embodiments of the present disclosure provides an audio playing method, and the audio playing method can be applied to one or more of the above-mentioned terminal devices 101, 102, and 103, can also be applied to the above-mentioned server 105, and can also be applied to terminal devices 101, 102, 103 and server 105. As shown in FIG. 2, the audio playing method includes steps S210-S240. At step S210, an audio file to be played is recognized as a text file containing one or more sentence segmentation symbols. At step S220, according to a corresponding relationship between the audio file and the text file, sentence segmentation tags are generated at positions corresponding to the sentence segmentation symbols in the audio file. At step S230, in response to a trigger operation, a target play point is determined according to a current play position of the audio file and respective positions of the sentence segmentation tags. At step S240, the audio file is played from the target play point.

With the audio playing method in this exemplary embodiment, the audio can be accurately positioned to the position that the user wants to listen to again without increasing the complexity of the user's operation, thereby realizing a relatively accurate loop playing.

Below, each step of the audio playing method in this exemplary embodiment will be further described.

In step S210, the audio file to be played is recognized as the text file containing one or more sentence segmentation symbols.

The audio file to be played is a file storing audio data. For example, the audio file may be music, teaching voice, or recording (such as voice information sent by a user in an instant messaging tool), which is not specifically limited in this example implementation.

Figure 3:
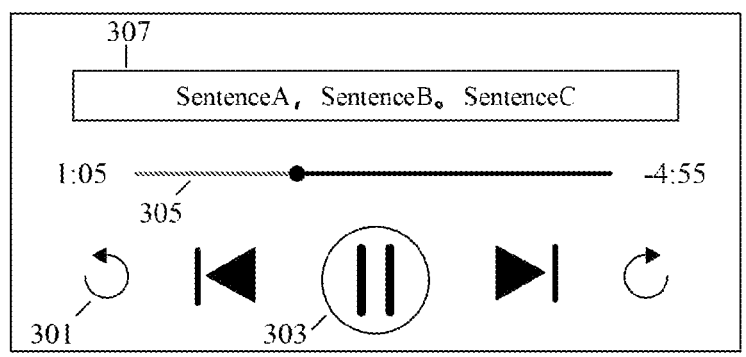
FIG. 3 is a schematic interface diagram of audio application software in an audio playing application scenario according to some embodiments of the disclosure.

The text file is a text file obtained by performing speech recognition on the above-mentioned audio file, and includes text characters corresponding to the audio content. Speech recognition can be implemented by using a well-known recognition algorithm in the prior art. In an optional embodiment, the specific implementation of the speech recognition process can be as follows: first, performing some preprocessing operations on the audio data in the above-mentioned audio file, such as pre-emphasizing, adding windows and framing, end point detection and other operations, then analyzing the preprocessed audio data and extracting required features, and finally using a discrete hidden Markov model trained by samples to make a speech recognition on speech signals after the feature extraction, so as to obtain the text file corresponding to the audio file. In a specific application scenario, as shown in FIG. 3, the audio application interface includes a text display region 307, which can be used to display recognized text file content.

The sentence segmentation symbol is used to segment the above text file. For example, the sentence segmentation symbol can be a comma, a semicolon or a period in the text file, or other symbols that can play a sentence-breaking role. This embodiment does not specifically limit this.

In step S220, according to the corresponding relationship between the audio file and the text file, sentence segmentation tags are generated at positions corresponding to the sentence segmentation symbols in the audio file.

The correspondence between the audio file and the text file may be a one-to-one correspondence between audio content and each character of the recognized text during the speech recognition process. The characters can be literal characters or numeric characters.

The sentence segmentation tag may be a special token used to identify the above-mentioned sentence segmentation symbol. For example, the sentence segmentation tag may be a special character inserted at the sentence segmentation symbol, or a dotting mark at the position where the sentence segmentation symbol is located in the sound track of the above audio file. Furthermore, the sentence segmentation tag may also be any other special mark that enables the role of identifying sentence segmentation symbol, which is not specially limited in this example embodiment.

In step S230, in response to the trigger operation, the target play point is determined according to the current play position of the audio file and respective positions of the sentence segmentation tags.

The trigger operation can be a touch operation by the user on the terminal device (for example, clicking a control on the touch screen, sliding in the display area, etc.), or a non-touch operation (for example, a mouse clicking control, a mechanical pressing button, etc.), or a trigger operation performed based on preset interaction conditions (for example, shaking, sound input, etc.). In a specific application scenario, as shown in FIG. 3, the audio application interface includes a return key 301, a play pause key 303, and a play progress bar 305, and the triggering operation is a triggering operation that the user presses the return key 301 on the play interface of the audio application to issue a request to return the preceding sentence.

The current play position of the audio file may be the position where a certain frame of the audio file is currently played. Specifically, the current play position may be the real-time play position corresponding to the audio frame on the play progress bar of the audio player. For example, an audio file contains four sentences A, B, C, and D, at the moment, the audio file is being played to the beginning of sentence B, and the beginning of sentence B is the above-mentioned current position.

The target play point may be the starting point in the audio file of the part to be played repeatedly in the audio file. For example, an audio file contains four sentences A, B, C, and D. If the user wants to replay the audio file from B, the starting point of B is the target play point.

The step of determining the target play point according to the current play position of the audio file and the positions of the sentence segmentation tags may be determining a closest adjacent sentence segmentation tag before the current play position of the audio file (i.e. one closest preceding sentence segmentation tag adjacent to the current play position of the audio file) as the target play point, or determining a next-closest adjacent sentence segmentation tag before the current play position of the audio file as the target play point. For example, in case that the audio content to be played is 'A sentence, B sentence. C sentence, D sentence.', the current play position is the beginning of sentence C, then the current play position is determined as the sentence segmentation symbol '.' at the end of sentence B or the sentence segmentation symbol ',' at the end of sentence A. This example embodiment does not make any special limitation on this.

In step S240, the audio file is played from the target play point.

After locating to the target play point, the audio file is started to play from the target play point, which may be to return the audio file to the position of the play progress bar corresponding to the target play point for playing. For example, if the audio frame of the target play point corresponds to the position of 1 minute and 30 seconds on the play progress bar, the playing starts at 1 minute and 30 seconds.

It should be noted that steps S210 and S220 in this exemplary embodiment may be performed before the audio is played. For example, first, the audio file to be played is recognized as a text file in the server, sentence segmentation tags are generated in the audio file, and then during the audio playing process, when the terminal device detects the user's trigger operation, the target play point is determined according to the current play position of the audio file and the positions of the sentence segmentation tags, and the audio file is played at the target play point. Furthermore, steps S210 and S220 may be performed when the audio is played. For example, when it is detected that the user triggers the control to play the audio, the speech recognition is started, the audio file to be played is recognized as a text file, and sentence segmentation tags are generated in the audio file, and when the terminal device detects that the user's triggering operation, a target play point is determined according to the current play position of the audio file and the positions of the sentence segmentation tags, and the audio file is played at the target play point. This example embodiment does not make any special limitation on this.

In this exemplary embodiment, the audio file to be played is recognized as the text file containing one or more sentence segmentation symbols; according to the correspondence relationship between the audio file and the text file, sentence segmentation tags are generated at positions corresponding to the sentence segmentation symbols in the audio file; in response to the trigger operation, the target play point is determined according to the current play position of the audio file and the positions of the sentence segmentation tags; the audio file is played from the target play point. In this way, when a user wants to re-listen a certain piece of audio content, he or she only needs to operate on the terminal to accurately locate the appropriate target play point without repeatedly sliding the play progress bar for positioning, and the operation is simple and convenient. In addition, by recognizing the audio file to be played as the text file containing sentence segmentation symbols, sentence segmentation is performed, so that the sentence segmentation process is not limited by the speed of audio playing, and accurate sentence segmentation can be achieved even if the playing speed is slow, so as to locate to the suitable play position for re-listening.

In an exemplary embodiment of the present disclosure, the step of recognizing the audio file to be played as the text file containing one or more sentence segmentation symbols includes: recognizing the audio file to be played as the text file, dividing the text file into a plurality of sub-text files with a sentence as a unit by using a preset sentence model, and marking a sentence segmentation symbol at the end of each of the sub-text files to generate the text file containing sentence segmentation symbols.

The text file is divided into the plurality of sub-text files by using the sentence segmentation model, each sub-text file can be regarded as a sentence, and a sentence segmentation symbol is added at the end of each sub-text file to form the text file containing sentence segmentation symbols.

In an exemplary embodiment of the present disclosure, the sentence model uses feature attributes of vocabulary of the sentence model to construct training samples, and is obtained by training through a CRF algorithm. That is, building training samples and then obtaining the sentence model by training through the CRF algorithm.

The sentence model can be trained separately according to the characteristics of different fields, such as the financial field, the communication field, the electric power field, the daily life field, etc. The feature attributes of vocabulary can include inherent attributes of vocabulary (such as verbs, nouns, adjectives, adverbs, prepositions, modal particles, etc.), sentence attributes of vocabulary (such as subject, predicate, object, attribute, adverbial, etc.), and semantic attributes of vocabulary in different fields.

The Conditional Random field (CRF) algorithm is an algorithm based on a probability judgment. It constructs training samples according to the feature attributes of the vocabulary, and obtains a sentence model corresponding to a specific field by training through the CRF algorithm. The probability of forming a sentence segmentation position can be calculated according to a pause rule of words with pause information in the text content in different fields, and the sentence segmentation is performed based on the calculated probability.

In some embodiments, the target sentence segmentation position of the text file is determined according to the sentence segmentation model, and when a confidence level of the sentence segmentation position of the text file is greater than a preset confidence level, the sentence segmentation position is determined as the target sentence segmentation position, and according to the target sentence segmentation position, the text file divided into sub-text files with a sentence as a unit.

After recognizing the audio file as the text file, the sentence segmentation model divides the text file into various characters and phrases, and reads each character and phrase from the text file in sequence. For example, the recognized content is 'I go home after get off work', then read 'I', 'go home', 'after', 'get off work' in sequence. When the content 'I go home' is read, the sentence segmentation model analyzes that the confidence level of the sentence segmentation position of 'go home' at the end of the text is 0.2, and the preset confidence level is 0.8, then continue to read the next character or phrase 'after', and so on. When the text 'I go home after get off work' is read, the sentence segmentation model analyzes that the confidence level of the sentence segmentation position at the end of the text is 0.9, and it exceeds the preset confidence level of 0.8, it can be determined that the end of 'get off work' is the target sentence segmentation position.

In an exemplary embodiment of the present disclosure, the corresponding relationship between the audio file and the text file includes the corresponding relationship established, on the time axis, between audio file and recognized characters of the text file during the process of recognizing the audio file to be played as the text file.

After the text file corresponding to the audio file is obtained by the speech recognition technology, the audio file and the text file are analyzed to obtain the corresponding relationship between the audio file and each character of the text file on the time axis during the speech recognition process. For example, a certain character in the text file corresponds to a certain second of audio content on the play progress bar.

In an exemplary embodiment of the present disclosure, in response to the trigger operation, determining the target play point according to the current play position of the audio file and the positions of the sentence segmentation tags includes: in response to the trigger operation, finding a preceding sentence segmentation tag adjacent to the current play position of the audio file, and determining a position of the preceding sentence segmentation tag in the audio file as the target play point.

Take an audio file containing four sentences A, B, C and D as an example, in case that the current audio file is played to sentence C, when one trigger operation is detected, one sentence segmentation tag before the sentence C is searched in the audio file. That is, the position of the sentence segmentation tag at the end of sentence B is used as the target play point. The above-mentioned target play point can be located by repeating the above-mentioned operation of finding the preceding sentence segmentation tag. Assuming that the audio file is currently playing sentence D, and the target play point is sentence B, that is, to start playing the audio file from the beginning of sentence B, then three trigger operations are required to search for the sentence segmentation tags of sentence C, sentence B, and sentence A in turn, and the position of the searched sentence segmentation tag of sentence A is used as the target play point. In this way, by the operation of returning to the preceding sentence for every triggering, the user can accurately locate the beginning of the preceding sentence of the current play position, and the user can find the target play point for playing with a simple operation, which is convenient to operate. It should be noted that the above scenario is only an exemplary illustration, and does not play any limiting role on the protection scope of this exemplary embodiment.

In an exemplary embodiment of the present disclosure, the sentence segmentation symbols may include a first sentence segmentation symbol and a second sentence segmentation symbol. The step of in response to the trigger operation, determining the target play point according to the current play position of the audio file and positions of the sentence segmentation tags may include: in response to the trigger operation, determining a text character corresponding to the current play position in the text file according to the correspondence relationship between the audio file and the text file; determining whether a character interval between the text character and the first sentence segmentation symbol is greater than a preset character interval; in response to determining the character interval between the text character and the first sentence segmentation symbol is greater than the preset character interval, determining a play position of a sentence segmentation tag corresponding to the first sentence segmentation symbol on a time axis as the target play point; and in response to determining the character interval between the text character and the first sentence segmentation symbol is less than or equal to the preset character interval, determining a play position of a sentence segmentation tag corresponding to the second segmentation symbol on the time axis as the target play point; wherein, the first sentence segmentation symbol is a preceding sentence segmentation symbol adjacent to the text character in the text file, and the second sentence segmentation symbol is a preceding sentence segmentation symbol adjacent to the first sentence segmentation symbol in the text file.

Figure 5:
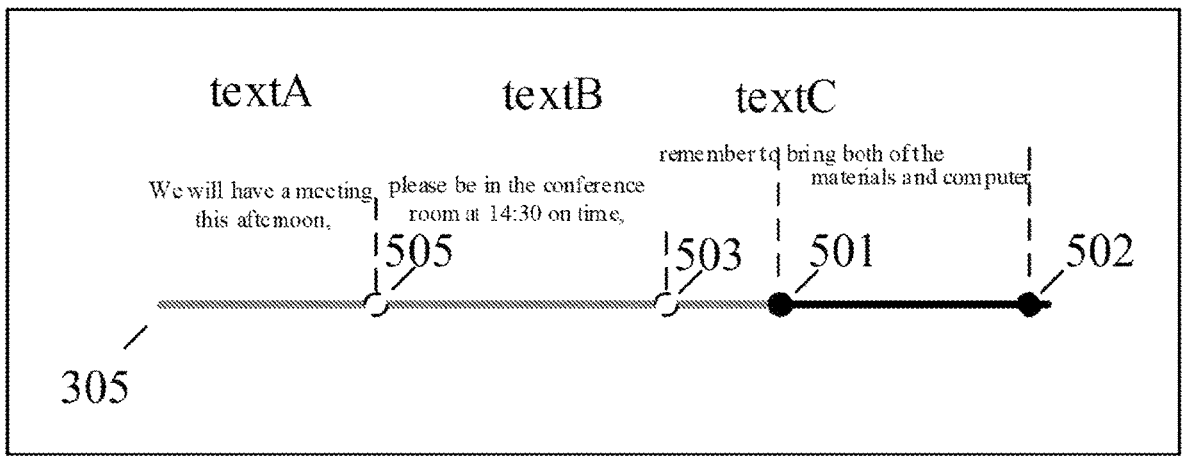
FIG. 5 is a schematic diagram of determining a target play point in an audio playing process according to some embodiments of the present disclosure.

Taking an audio file containing four sentences A, B, C, and D as an example, the audio play progress bar is currently playing to the beginning of sentence C. When one trigger operation is detected, according to the corresponding relationship between the audio file and the text file, which text character of the sentence C is currently played is determined. If it is within the preset character spacing, i.e., the currently played text character of the sentence C is within the preset character spacing, then find the respective sentence segmentation symbol of sentence B and sentence A in turn in the text file, and then correspondingly find the respective sentence segmentation tag of sentence A and sentence B in the audio file. Furthermore, it is determined that the position where the sentence segmentation tag of sentence A is located (that is, the beginning of sentence B) is used as the target play point. As shown in FIG. 5, if the current play reaches position 501 at the beginning of the sentence C, and the position 501 corresponds to the second character at the beginning of the text C (indicated by the dotted line of the text content 'remember to' in FIG. 5), and the preset character spacing is 3 characters, at this time, the sentence segmentation symbol of text A is found forward, and the sentence segmentation symbol of text A corresponds to the sentence segmentation tag of sentence A, so position 505 where the sentence segmentation tag of sentence A is located is determined as the target play point. In the same way, if it is not within the preset character spacing, then find the sentence segmentation symbol of text B in the text file, and then correspondingly find the sentence segmentation tag of sentence B in the audio file, and determine a position where the sentence segmentation tag of sentence B is located (i.e. at the beginning of statement C) as the target play point. As shown in FIG. 5, if it is currently playing to position 502 of the sentence C and the position 502 corresponds to the 9th character of the text C (which is counted from the beginning of the text C and indicated by the dotted line of the text content 'computer' in FIG. 5), and the preset character spacing is 3 character, the sentence segmentation symbol of text B is found forward, and the sentence segmentation symbol of text B corresponds to the sentence segmentation tag of sentence B, so position 503 where the sentence segmentation tag of sentence B is located is determined as the target play point.

In this exemplary embodiment, the user's replay intention can be determined by comparing the character spacing between the text character corresponding to the real-time play position of the audio file and a preceding sentence segmentation symbol, so that the most accurate target play point can be found intelligently, and the user can accurately locate and play the audio position he or she wants to listen to again without repeatedly triggering the return operation, which further improves the convenience of the operation and thus enhances the user experience. It should be noted that the above scenario is only an exemplary illustration, and does not play any limiting role on the protection scope of this exemplary embodiment.

In an exemplary embodiment of the present disclosure, the sentence segmentation tags may include a first sentence segmentation tag and a second sentence segmentation tag. The step of in response to the trigger operation, determining the target play point according to the current play position of the audio file and positions of the sentence segmentation tags may include: in response to the trigger operation, determining whether a time interval between a play time corresponding to the current play position and a play time corresponding to the first sentence segmentation tag is greater than a preset time interval; in response to determining the time interval between the play time corresponding to the current play position and the play time corresponding to the first sentence segmentation tag is greater than the preset time interval, determining a play position of the first sentence segmentation tag on a time axis as the target play point; and in response to determining the time interval between the play time corresponding to the current play position and the play time corresponding to the first sentence segmentation tag is less than or equal to the preset time interval, determining a play position of the second sentence segmentation tag on the time axis as the target play point; wherein, the first sentence segmentation tag is a preceding sentence segmentation tag adjacent to the current play position in the audio file, and the second sentence segmentation tag is a preceding sentence segmentation tag adjacent to the first sentence segmentation tag in the audio file.

Figure 6:
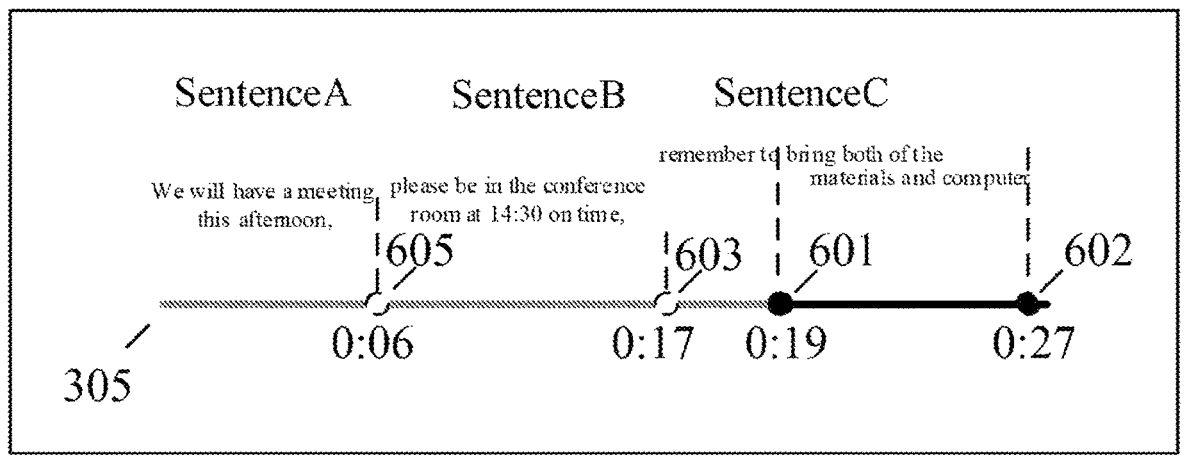
FIG. 6 is a schematic diagram of determining a target play point in an audio playing process of some embodiments of the present disclosure.

Taking an audio file containing four sentences A, B, C, and D as an example, the audio play progress bar is currently playing to the beginning of sentence C. When one trigger operation is detected, whether the time interval between the play time corresponding to the current play position on the audio play progress bar and the play time corresponding to the sentence segmentation tag of statement B is greater than the preset time interval is determined. If time interval is within the preset time interval, then find sentence segmentation tags of sentence B and sentence A in turn, and a position where the sentence segmentation tag of sentence A is located (that is, at the beginning of sentence B) is used as the target play point. As shown in FIG. 6, if the current play reaches position 601 and the position 601 corresponds to the 2nd second from the beginning of sentence C (the position of 0:19 of the play progress bar in FIG. 6), and the preset time interval is 3 seconds, then the sentence segmentation tag of the sentence A is searched forward and position 605 where the sentence segmentation tag of sentence A is located (the position corresponding to 0:06 of the play progress bar in FIG. 6) is determined as the target play point. Similarly, if the time interval is not within the preset time interval, the sentence segmentation tag of sentence B is found, and a position where the sentence segmentation tag of sentence B is located (i.e., the beginning of sentence C) is used as the target play point. As shown in FIG. 6, if the current play reaches the position 602 at the 10th second from the beginning of the sentence C (the position of 0:27 of the play progress bar in FIG. 6), and the preset time interval is 3 seconds, then the sentence segmentation tag of sentence B is searched forward, and a position 603 where the sentence segmentation tag of sentence B is located (the position at 0:17 of the play progress bar in FIG. 6) is determined as the target play point.

In this exemplary embodiment, the user's replay intention can be determined by comparing the time interval between the play time of the real-time play position of the audio file and the play time of the preceding segmentation tag, so that the most accurate target play point can be found intelligently, and the user can accurately locate and play the audio position he or she wants to listen to again without repeatedly triggering the return operation, which further improves the convenience of the operation and thus enhances the user experience. It should be noted that the above scenario is only an exemplary illustration, and does not play any limiting role on the protection scope of this exemplary embodiment.

In an exemplary embodiment of the present disclosure, the audio playing method further includes: in response to that the preceding sentence segmentation tag cannot be found at the current play position of the audio file, the audio file to be played is played from the beginning.

Taking an audio file containing four sentences A, B, C and D as an example, the first sentence of the audio file (that is, sentence A) is not marked with a sentence segmentation tag. When one trigger operation is detected, if the current play is sentence A, then sentence A is played from the beginning.

In an exemplary embodiment of the present disclosure, the sentence segmentation symbol is a comma, a period or a semicolon.

The sentence segmentation symbol may be a comma, a period, or a semicolon, or other symbols that can play a role of breaking a sentence, which is not specifically limited in this exemplary embodiment.

Figure 4:
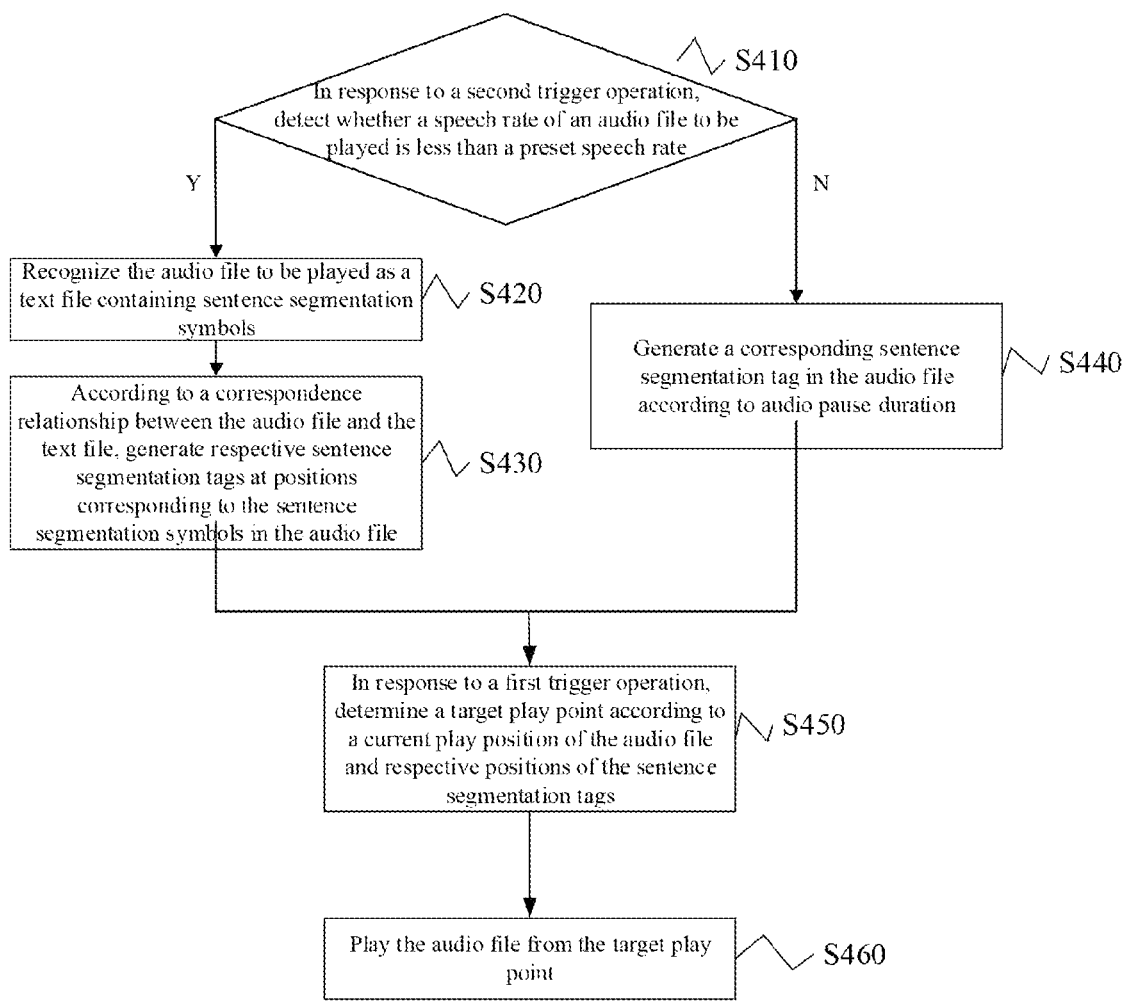
FIG. 4 is a flowchart of an audio playing method according to some embodiments of the present disclosure.

Another aspect of the embodiments of the present disclosure provides an audio playing method, and the audio playing method can be applied to one or more of the above-mentioned terminal devices 101, 102, and 103, can also be applied to the above-mentioned server 105, and can also be applied to in the terminal devices 101, 102, 103 and the server 105. As shown in FIG. 4, the audio playing method includes steps S410-S460. At step S410, in response to a second trigger operation, whether a speech rate of an audio file to be played is less than a preset speech rate is detected. At step S420, in response to detecting that the speech rate of the audio file to be played is less than the preset speech rate, the audio file to be played is recognized as a text file containing one or more sentence segmentation symbols. At step S430, according to a corresponding relationship between the audio file and the text file, sentence segmentation tags are generated at positions corresponding to the sentence segmentation symbols in the audio file. At step S440, in response to detecting that the speech rate of the audio file to be played is greater than or equal to the preset speech rate, a corresponding sentence segmentation tag is generated in the audio file according to audio pause duration. At step S450, in response to a first trigger operation, a target play point is determined according to a current play position of the audio file and positions of the sentence segmentation tags. At step S460, the audio file is played from the target play point.

Below, each step of the audio playing method in this exemplary embodiment will be further described.

In step S410, in response to the second trigger operation, whether a speech rate of an audio file to be played is less than the preset speech rate is detected.

The second trigger operation may be a touch operation by the user on the terminal device (for example, clicking a control on the touch screen, sliding in the display area, etc.), or a non-touch operation (for example a mouse clicking control, a mechanical pressing button, etc.), or a trigger operation performed based on preset interaction conditions (for example, shaking, sound input, etc.). In a specific application scenario, as shown in FIG. 3, the second triggering operation is a triggering operation that the user presses the pause key 303 on the play interface of the audio application to play the audio file.

In response to detecting the second trigger operation, it is determined whether the play speech rate of the audio file is less than the preset speech rate.

In steps S420-S430, in response to determining that the speech rate of the audio file to be played is less than the preset speech rate, the audio file to be played is recognized as the text file containing one or more sentence segmentation symbols; according to the corresponding relationship between the audio file and the text file, sentence segmentation tags are generated at positions corresponding to the sentence segmentation symbols in the audio file.

If the play speech rate is less than the preset speech rate, the sentence segmentation tags of the audio file are determined according to the speech recognition, and according to the correspondence relationship between the audio file and the text file, the sentence segmentation tags are generated at positions corresponding to the sentence segmentation symbols in the audio file.

The correspondence relationship between the audio file and the text file may be a one-to-one correspondence between the audio content and each character of the recognized text during the speech recognition process. The characters can be literal characters or numeric characters.

The sentence segmentation tag may be a special token used to identify the above-mentioned sentence segmentation symbol. For example, the sentence segmentation tag may be a special character inserted at the sentence segmentation symbol, or a dotting mark at the position where the sentence segmentation symbol is located in the sound track of the above audio file. Furthermore, the sentence segmentation tag may also be any other special mark that enables the role of identifying sentence segmentation symbol, which is not specially limited in this example embodiment.

In step S440, in response to determining that the speech rate of the audio file to be played is greater than or equal to the preset speech rate, a corresponding sentence segmentation tag is generated in the audio file according to the audio pause duration.

If the play speech rate is greater than the preset speech rate, the sentence segmentation tag of the audio file is determined according to the pause duration of the audio. For example, when it is detected that the duration of the audio silent segment is greater than a preset threshold, a special character is inserted into the silent segment to form the sentence segmentation tag.

In step S450, in response to the first trigger operation, the target play point is determined according to the current play position of the audio file and the positions of the sentence segmentation tags.

The first trigger operation may be a touch operation by the user on the terminal device (for example, clicking a control on the touch screen, sliding in the display area, etc.), or a non-touch operation (for example, a mouse clicking control, a mechanical pressing button, etc.), or a trigger operation performed based on preset interaction conditions (for example, shaking, sound input, etc.). In a specific application scenario, as shown in FIG. 3, the audio application interface includes a return key 301, a play pause key 303, and a play progress bar 305, and the triggering operation is a triggering operation that the user presses the return key 301 on the play interface of the audio application to issue a request to return the preceding sentence.

The current play position of the audio file may be the position where a certain frame of the audio file is located is currently played. Specifically, the current play position may be the real-time play position corresponding to the audio frame on the play progress bar of the audio player. For example, an audio file contains four sentences A, B, C, and D, at the moment, the audio file is being played to the beginning of sentence B, and the beginning of sentence B is the above-mentioned current position.

The target play point may be the starting point in the audio file of the part to be played repeatedly in the audio file. For example, an audio file contains four sentences A, B, C, and D. If the user wants to replay the audio file from B, the starting point of B is the target play point.

The step of determining the target play point according to the current play position of the audio file and the positions of the sentence segmentation tags may be determining a closest adjacent sentence segmentation tag before the current play position of the audio file (i.e. one closest preceding sentence segmentation tag adjacent to the current play position of the audio file) as the target play point, or determining a next-closest adjacent sentence segmentation tag before the current play position of the audio file as the target play point. For example, in case that the audio content to be played is 'A sentence, B sentence. C sentence, D sentence.', the current play position is the beginning of sentence C, then the current play position is determined as the sentence segmentation symbol '.' at the end of sentence B or the sentence segmentation symbol ',' at the end of sentence A. This example embodiment does not make any special limitation on this.

In step S460, the audio file is played from the target play point.

After locating to the target play point, the audio file is started to play from the target play point, which may be to return the audio file to the position of the play progress bar corresponding to the target play point for playing. For example, if the audio frame of the target play point corresponds to the position of 1 minute and 30 seconds on the play progress bar, the playing starts at 1 minute and 30 seconds.

In this exemplary embodiment, the generation method of the sentence segmentation tag is intelligently selected according to different audio play speech rates, and the speech recognition method is used when the play speech rate is relatively slow and then according to the correspondence relationship between the audio file and the text file, sentence segmentation tags are generated at the positions corresponding to the sentence segmentation symbols in the audio file, so that the segment location in the audio file can be accurately found. When the play speed rate is fast, it is more efficient to use the method of recognizing audio pause to generate the sentence segmentation tag. The audio playing method of the present exemplary embodiment can be intelligently applied to various complex play speech rate environments, while taking into account the accuracy and efficiency of sentence segmentation recognition, thereby improving user experience.

In an exemplary embodiment of the present disclosure, the step of recognizing the audio file to be played as the text file containing one or more sentence segmentation symbols includes: recognizing the audio file to be played as the text file, dividing the text file into a plurality of sub-text files with a sentence as a unit by using a preset sentence model, and marking a sentence segmentation symbol at the end of each of the sub-text files to generate the text file containing sentence segmentation symbols.

The text file is divided into the plurality of sub-text files by using the sentence segmentation model, each sub-text file can be regarded as a sentence, and a sentence segmentation symbol is added at the end of each sub-text file to form the text file containing sentence segmentation symbols.

In an exemplary embodiment of the present disclosure, the sentence model uses feature attributes of vocabulary of the sentence model to construct training samples, and is obtained by training through a CRF algorithm. That is, building training samples and then obtaining the sentence model by training through the CRF algorithm.

The sentence model can be trained separately according to the characteristics of different fields, such as the financial field, the communication field, the electric power field, the daily life field, etc. The feature attributes of vocabulary can include inherent attributes of vocabulary (such as verbs, nouns, adjectives, adverbs, prepositions, modal particles, etc.), sentence attributes of vocabulary (such as subject, predicate, object, attribute, adverbial, etc.), and semantic attributes of vocabulary in different fields.

The Conditional Random field (CRF) algorithm is an algorithm based on a probability judgment. It constructs training samples according to the feature attributes of the vocabulary, and obtains a sentence model corresponding to a specific field by training through the CRF algorithm. The probability of forming a sentence segmentation position can be calculated according to a pause rule of words with pause information in the text content in different fields, and the sentence segmentation is performed based on the calculated probability.

In some embodiments, the target sentence segmentation position of the text file is determined according to the sentence segmentation model, and when a confidence level of the sentence segmentation position of the text file is greater than a preset confidence level, the sentence segmentation position is determined as the target sentence segmentation position, and according to the target sentence segmentation position, the text file divided into sub-text files with a sentence as a unit.

After recognizing the audio file as the text file, the sentence segmentation model divides the text file into various characters and phrases, and reads each character and phrase from the text file in sequence. For example, the recognized content is 'I go home after get off work', then read 'I', 'go home', 'after', 'get off work' in sequence. When the content 'I go home' is read, the sentence segmentation model analyzes that the confidence level of the sentence segmentation position of 'go home' at the end of the text is 0.2, and the preset confidence level is 0.8, then continue to read the next character or phrase 'after', and so on. When the text 'I go home after get off work' is read, the sentence segmentation model analyzes that the confidence level of the sentence segmentation position at the end of the text is 0.9, and it exceeds the preset confidence level of 0.8, it can be determined that the end of 'get off work' is the target sentence segmentation position.

In an exemplary embodiment of the present disclosure, the corresponding relationship between the audio file and the text file includes the corresponding relationship established, on the time axis, between audio file and recognized characters of the text file during the process of recognizing the audio file to be played as the text file.

After the text file corresponding to the audio file is obtained by the speech recognition technology, the audio file and the text file are analyzed to obtain the corresponding relationship between the audio file and each character of the text file on the time axis during the speech recognition process. For example, a certain character in the text file corresponds to a certain second of audio content on the play progress bar.

In an exemplary embodiment of the present disclosure, in response to the trigger operation, determining the target play point according to the current play position of the audio file and the positions of the sentence segmentation tags includes: in response to the trigger operation, finding a preceding sentence segmentation tag adjacent to the current play position of the audio file, and determining a position of the preceding sentence segmentation tag in the audio file as the target play point.

Take an audio file containing four sentences A, B, C and D as an example, in case that the current audio file is played to sentence C, when one trigger operation is detected, one sentence segmentation tag before the sentence C is searched in the audio file. That is, the position of the sentence segmentation tag at the end of sentence B is used as the target play point. The above-mentioned target play point can be located by repeating the above-mentioned operation of finding the preceding sentence segmentation tag. Assuming that the audio file is currently playing sentence D, and the target play point is sentence B, that is, to start playing the audio file from the beginning of sentence B, then three trigger operations are required to search for the sentence segmentation tags of sentence C, sentence B, and sentence A in turn, and the position of the searched sentence segmentation tag of sentence A is used as the target play point. In this way, by the operation of returning to a preceding sentence for every triggering, the user can accurately locate the beginning of the preceding sentence of the current play position, and the user can find the target play point for playing with a simple operation, which is convenient to operate. It should be noted that the above scenario is only an exemplary illustration, and does not play any limiting role on the protection scope of this exemplary embodiment.

In an exemplary embodiment of the present disclosure, the sentence segmentation symbols may include a first sentence segmentation symbol and a second sentence segmentation symbol. The step of in response to the trigger operation, determining the target play point according to the current play position of the audio file and positions of the sentence segmentation tags may include: in response to the trigger operation, determining a text character corresponding to the current play position in the text file according to the correspondence relationship between the audio file and the text file; determining whether a character interval between the text character and the first sentence segmentation symbol is greater than a preset character interval; in response to determining the character interval between the text character and the first sentence segmentation symbol is greater than the preset character interval, determining a play position of a sentence segmentation tag corresponding to the first sentence segmentation symbol on a time axis as the target play point; and in response to determining the character interval between the text character and the first sentence segmentation symbol is less than or equal to the preset character interval, determining a play position of a sentence segmentation tag corresponding to the second segmentation symbol on the time axis as the target play point; wherein, the first sentence segmentation symbol is a preceding sentence segmentation symbol adjacent to the text character in the text file, and the second sentence segmentation symbol is a preceding sentence segmentation symbol adjacent to the first sentence segmentation symbol in the text file.

Taking an audio file containing four sentences A, B, C, and D as an example, the audio play progress bar is currently playing to the beginning of sentence C. When one trigger operation is detected, according to the corresponding relationship between the audio file and the text file, which text character of the sentence C is currently played is determined. If it is within the preset character spacing, i.e., the currently played text character of the sentence C is within the preset character spacing, then find the respective sentence segmentation symbol of sentence B and sentence A in turn in the text file, and then correspondingly find the respective sentence segmentation tag of sentence A and sentence B in the audio file. Furthermore, it is determined that the position where the sentence segmentation tag of sentence A is located (that is, the beginning of sentence B) is used as the target play point. As shown in FIG. 5, if the current play reaches position 501 at the beginning of the sentence C, and the position 501 corresponds to the second character at the beginning of the text C (indicated by the dotted line of the text content 'remember to' in FIG. 5), and the preset character spacing is 3 characters, at this time, the sentence segmentation symbol of text A is found forward, and the sentence segmentation symbol of text A corresponds to the sentence segmentation tag of sentence A, so position 505 where the sentence segmentation tag of sentence A is located is determined as the target play point. In the same way, if it is not within the preset character spacing, then find the sentence segmentation symbol of text B in the text file, and then correspondingly find the sentence segmentation tag of sentence B in the audio file, and determine a position where the sentence segmentation tag of sentence B is located (i.e. at the beginning of statement C) as the target play point. As shown in FIG. 5, if it is currently playing to position 502 of the sentence C and the position 502 corresponds to the 9th character of the text C (which is counted from the beginning of the text C and indicated by the dotted line of the text content 'computer' in FIG. 5), and the preset character spacing is 3 character, the sentence segmentation symbol of text B is found forward, and the sentence segmentation symbol of text B corresponds to the sentence segmentation tag of sentence B, so position 503 where the sentence segmentation tag of sentence B is located is determined as the target play point.

In this exemplary embodiment, the user's replay intention can be determined by comparing the character spacing between the text character corresponding to the real-time play position of the audio file and a preceding sentence segmentation symbol, so that the most accurate target play point can be found intelligently, and the user can accurately locate and play the audio position he or she wants to listen to again without repeatedly triggering the return operation, which further improves the convenience of the operation and thus enhances the user experience. It should be noted that the above scenario is only an exemplary illustration, and does not play any limiting role on the protection scope of this exemplary embodiment.

In an exemplary embodiment of the present disclosure, the sentence segmentation tags may include a first sentence segmentation tag and a second sentence segmentation tag. The step of in response to the trigger operation, determining the target play point according to the current play position of the audio file and positions of the sentence segmentation tags may include: in response to the trigger operation, determining whether a time interval between a play time corresponding to the current play position and a play time corresponding to the first sentence segmentation tag is greater than a preset time interval; in response to determining the time interval between the play time corresponding to the current play position and the play time corresponding to the first sentence segmentation tag is greater than the preset time interval, determining a play position of the first sentence segmentation tag on a time axis as the target play point; and in response to determining the time interval between the play time corresponding to the current play position and the play time corresponding to the first sentence segmentation tag is less than or equal to the preset time interval, determining a play position of the second sentence segmentation tag on the time axis as the target play point; wherein, the first sentence segmentation tag is a preceding sentence segmentation tag adjacent to the current play position in the audio file, and the second sentence segmentation tag is a preceding sentence segmentation tag adjacent to the first sentence segmentation tag in the audio file.

Taking an audio file containing four sentences A, B, C, and D as an example, the audio play progress bar is currently playing to the beginning of sentence C. When one trigger operation is detected, whether the time interval between the play time corresponding to the current play position on the audio play progress bar and the play time corresponding to the sentence segmentation tag of statement B is greater than the preset time interval is determined. If time interval is within the preset time interval, then find sentence segmentation tags of sentence B and sentence A in turn, and a position where the sentence segmentation tag of sentence A is located (that is, at the beginning of sentence B) is used as the target play point. As shown in FIG. 6, if the current play reaches position 601 and the position 601 corresponds to the 2nd second from the beginning of sentence C (the position of 0:19 of the play progress bar in FIG. 6), and the preset time interval is 3 seconds, then the sentence segmentation tag of the sentence A is searched forward and position 605 where the sentence segmentation tag of sentence A is located (the position corresponding to 0:06 of the play progress bar in FIG. 6) is determined as the target play point. Similarly, if the time interval is not within the preset time interval, the sentence segmentation tag of sentence B is found, and a position where the sentence segmentation tag of sentence B is located (i.e., the beginning of sentence C) is used as the target play point. As shown in FIG. 6, if the current play reaches the position 602 at the 10th second from the beginning of the sentence C (the position of 0:27 of the play progress bar in FIG. 6), and the preset time interval is 3 seconds, then the sentence segmentation tag of sentence B is searched forward, and a position 603 where the sentence segmentation tag of sentence B is located (the position at 0:17 of the play progress bar in FIG. 6) is determined as the target play point.

In this exemplary embodiment, the user's replay intention can be determined by comparing the time interval between the play time of the real-time play position of the audio file and the play time of the preceding segmentation tag, so that the most accurate target play point can be found intelligently, and the user can accurately locate and play the audio position he or she wants to listen to again without repeatedly triggering the return operation, which further improves the convenience of the operation and thus enhances the user experience. It should be noted that the above scenario is only an exemplary illustration, and does not play any limiting role on the protection scope of this exemplary embodiment.

In an exemplary embodiment of the present disclosure, the audio playing method further includes: in response to that the preceding sentence segmentation tag cannot be found at the current play position of the audio file, the audio file to be played is played from the beginning.

Taking an audio file containing four sentences A, B, C and D as an example, the first sentence of the audio file (that is, sentence A) is not marked with a sentence segmentation tag. When one trigger operation is detected, if the current play is sentence A, then sentence A is played from the beginning.

In an exemplary embodiment of the present disclosure, the sentence segmentation symbol is a comma, a period or a semicolon.

The sentence segmentation symbol may be a comma, a period, or a semicolon, or other symbols that can play a role of breaking a sentence, which is not specifically limited in this exemplary embodiment.

In an exemplary embodiment of the present disclosure, the generating the corresponding sentence segmentation tag in the audio file according to the audio pause duration includes in response to detecting that the audio pause duration is greater than a preset duration, generating the corresponding sentence segmentation tag in the audio file.

The pause duration threshold can be preset. During the playing of the audio file, when it is detected that the duration of the audio silent segment is greater than the preset pause duration threshold, a special character is inserted into the silent segment to form a sentence segmentation tag.

Figure 7:
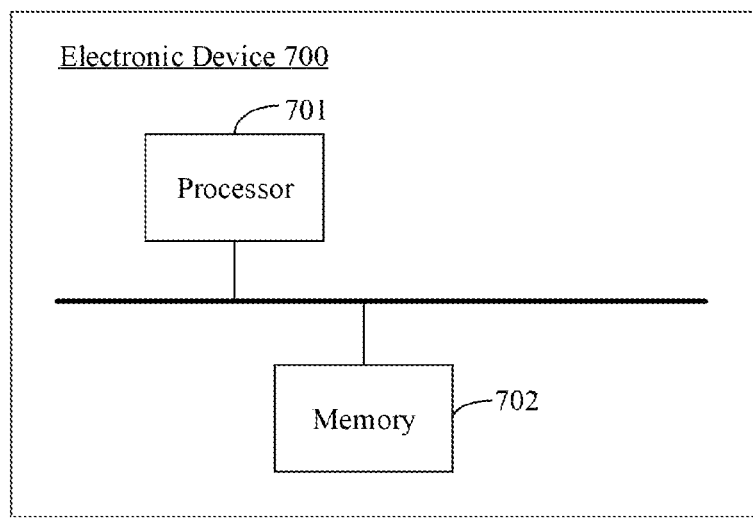
FIG. 7 is a schematic structural diagram of an electronic device according to some embodiments of the disclosure.

Embodiments of the present disclosure also provide an electronic device. FIG. 7 is a schematic structural diagram of an electronic device according to an embodiment of the present disclosure. As shown in FIG. 7, the electronic device 700 of this embodiment includes a processor 701 and a memory 702; wherein, the memory 702 is used to store computer-executed instructions; the processor 701 is configured to execute the computer-executed instructions stored in the memory to implement the various steps performed in the above-described embodiments. Specifically, the relevant descriptions in the foregoing method embodiments can be used.

Embodiments of the present disclosure further provide a computer-readable storage medium, wherein computer-executable instructions are stored in the computer-readable storage medium, and when a processor executes the computer-executable instructions, the above-mentioned audio playing method is implemented.

In the several embodiments provided in the present disclosure, it should be understood that the disclosed apparatus and method may be implemented in other manners. For example, the apparatus embodiments described above are only illustrative. For example, the division of the modules is only a logical function division. In actual implementation, there may be other division methods. For example, multiple modules may be combined or integrated into another system, or some features can be ignored, or not implemented. On the other hand, the shown or discussed mutual coupling or direct coupling or communication connection may be through some interfaces, and indirect coupling or communication connection of apparatus or modules may be in electrical, mechanical or other forms. In addition, each functional module in each embodiment of the present disclosure may be integrated into one processing unit, or each module may exist physically alone, or two or more modules may be integrated into one unit. The units formed by the above modules can be implemented in the form of hardware, or can be implemented in the form of hardware plus software functional units.

The above-mentioned integrated modules implemented in the form of software functional modules may be stored in a computer-readable storage medium. The above-mentioned software function modules are stored in a storage medium, and include several instructions to enable a computer device (which may be a personal computer, a server, or a network device, etc.) or a processor to execute a part of steps in the method according to the various embodiments of the present disclosure. It should be understood that the above processor may be a central processing unit (CPU), and may also be other general-purpose processors, digital signal processors (DSP), application-specific integrated circuits (ASIC) and so on. A general purpose processor may be a microprocessor or the processor may be any conventional processor or the like. The steps of the method disclosed in conjunction with the present disclosure can be directly embodied as executed by a hardware processor, or executed by a combination of hardware and software modules in the processor.

The memory may include high-speed RAM memory, and may also include non-volatile storage NVM, such as at least one magnetic disk memory, and may also be a U disk, a removable hard disk, a read-only memory, a magnetic disk or an optical disk, and the like. The bus may be an Industry Standard Architecture (ISA) bus, a Peripheral Component (PCI) bus, or an Extended Industry Standard Architecture (EISA) bus, or the like. The bus can be divided into an address bus, a data bus, a control bus and so on. For ease of representation, the buses in the drawings of the present disclosure are not limited to only one bus or one type of bus. The above storage medium can be implemented by any type of volatile or non-volatile storage devices or combinations thereof, such as Static Random Access Memory (SRAM), Electrically Erasable Programmable Read-Only Memory (EEPROM), Erasable Programmable Read Only Memory (EPROM), Programmable Read Only Memory (PROM), Read Only Memory (ROM), Magnetic Memory, Flash Memory, Magnetic Disk or Optical Disk. A storage medium can be any available medium that can be accessed by a general purpose computer or special purpose computer.

An exemplary storage medium is coupled to the processor, such that the processor can read information from, and write information to, the storage medium. Of course, the storage medium can also be an integral part of the processor. The processor and the storage medium may be located in application specific integrated circuits (ASIC). Of course, the processor and the storage medium may also exist in the electronic device or the host device as discrete components.

The purpose of the present disclosure is to provide an audio playing method, an electronic device, and a storage medium, so as to at least to a certain extent overcome one or more problems caused by limitations and defects of the related art.

In some embodiments of the present disclosure, there is provided an audio playing method. The audio playing method may include: recognizing an audio file to be played as a text file containing sentence segmentation symbols; generating respective sentence segmentation tags at positions corresponding to the sentence segmentation symbols in the audio file according to a correspondence relationship between the audio file and the text file; in response to a trigger operation, determining a target play point according to a current play position of the audio file and respective positions of the sentence segmentation tags; and playing the audio file from the target play point.

In the embodiments, when the user wants to re-listen to a certain audio content, he or she only needs to operate on the terminal and then an appropriate target play point can be accurately located, and there is no need to repeatedly slide a play progress bar to locate, and the operation is simple and convenient. In addition, by recognizing the audio file to be played as a text file containing one or more sentence segmentation symbols, that is, a sentence segmentation process is performed on the audio file to be played, so that the sentence segmentation process is not limited by an audio play speed, and the accurate sentence segmentation can be achieved even if the audio play speed is slow, and then suitable play position can be accurately located for re-listening.

In the embodiments of the present disclosure, the in response to the trigger operation, determining the target play point according to the current play position of the audio file and the respective positions of the sentence segmentation tags includes: in response to the trigger operation, finding a preceding sentence segmentation tag adjacent to the current play position of the audio file, and determining a position of the preceding sentence segmentation tag in the audio file as the target play point.

In the embodiments of the present disclosure, each time the operation of returning to the preceding sentence is triggered, the beginning of the preceding sentence of the current play position can be accurately located, and the user can find or search for the target play point to play the audio file with a simple operation, which is convenient to operate.

In the embodiments of the present disclosure, the sentence segmentation symbols include a first sentence segmentation symbol and a second sentence segmentation symbol; wherein the in response to the trigger operation, determining the target play point according to the current play position of the audio file and the respective positions of the sentence segmentation tags may include: in response to the trigger operation, determining a text character corresponding to the current play position in the text file according to the correspondence relationship between the audio file and the text file; determining whether a character interval between the text character and the first sentence segmentation symbol is greater than a preset character interval; in response to determining the character interval between the text character and the first sentence segmentation symbol is greater than the preset character interval, determining a play position of a sentence segmentation tag corresponding to the first sentence segmentation symbol on a time axis as the target play point; and in response to determining the character interval between the text character and the first sentence segmentation symbol is less than or equal to the preset character interval, determining a play position of a sentence segmentation tag corresponding to the second segmentation symbol on the time axis as the target play point; wherein, the first sentence segmentation symbol is a preceding sentence segmentation symbol adjacent to the text character in the text file, and the second sentence segmentation symbol is a preceding sentence segmentation symbol adjacent to the first sentence segmentation symbol in the text file.

In the embodiments of the present disclosure, the user's replay intent can be determined by comparing the character spacing between the text character corresponding to the real-time play position of the audio file and the preceding sentence segmentation symbol, and the target play point can be found intelligently and most accurately. It is easier to accurately locate to the audio position that you want to listen to again without repeatedly trigger the return operation, which further improves the convenience of the operation and thus enhances the user experience.

In embodiments of the present disclosure, the sentence segmentation tags may include a first sentence segmentation tag and a second sentence segmentation tag; wherein the in response to the trigger operation, determining the target play point according to the current play position of the audio file and the respective positions of the sentence segmentation tags may include: in response to the trigger operation, determining whether a time interval between a play time corresponding to the current play position and a play time corresponding to the first sentence segmentation tag is greater than a preset time interval; in response to determining the time interval between the play time corresponding to the current play position and the play time corresponding to the first sentence segmentation tag is greater than the preset time interval, determining a play position of the first sentence segmentation tag on a time axis as the target play point; and in response to determining the time interval between the play time corresponding to the current play position and the play time corresponding to the first sentence segmentation tag is less than or equal to the preset time interval, determining a play position of the second sentence segmentation tag on the time axis as the target play point; wherein, the first sentence segmentation tag is a preceding sentence segmentation tag adjacent to the current play position in the audio file, and the second sentence segmentation tag is a preceding sentence segmentation tag adjacent to the first sentence segmentation tag in the audio file.

In the embodiments of the present disclosure, the user's replay intention can be determined by comparing the time interval between the play time of the real-time play position of the audio file and the play time of the preceding sentence segmentation tag, so that the target play point can be found intelligently and most accurately. It is easier to accurately locate to the audio position that you want to listen to again without repeatedly trigger the return operation, which further improves the convenience of the operation and thus enhances the user experience.

In some embodiments of the present disclosure, there is provided an audio playing method. The audio playing method may include: in response to a second trigger operation, detecting whether a speech rate of an audio file to be played is less than a preset speech rate; in response to detecting the speech rate of the audio file to be played is less than the preset speech rate, recognizing the audio file to be played as a text file containing sentence segmentation symbols; generating respective sentence segmentation tags at positions corresponding to the sentence segmentation symbols in the audio file according to a correspondence relationship between the audio file and the text file; in response to detecting the speech rate of the audio file to be played is greater than or equal to the preset speech rate, generating a corresponding sentence segmentation tag in the audio file according to an audio pause duration; in response to a first trigger operation, determining a target play point according to a current play position of the audio file and respective positions of the sentence segmentation tags; and playing the audio file from the target play point.

In some embodiments of the present disclosure, the generating the corresponding sentence segmentation tag in the audio file according to the audio pause duration includes: in response to detecting that the audio pause duration is greater than a preset duration, generating the corresponding sentence segmentation tag in the audio file.

In some embodiments of the present disclosure, there is provided an electronic device. The electronic device may include: a processor and a display component; and memory configured to store instructions executable by the processor; wherein the processor is configured to execute the above-mentioned audio playing method by executing the instructions.

In some embodiments of the present disclosure, there is provided a computer-readable storage medium with a computer program stored thereon, wherein when the computer program is executed by a processor, the processor implements the above-mentioned audio playing method.

Those of ordinary skill in the art can understand that all or part of the steps of implementing the above method embodiments may be completed by program instructions related to hardware. The aforementioned program can be stored in a computer-readable storage medium. When the program is executed, the steps including the above method embodiments are executed; and the foregoing storage medium includes: ROM, RAM, magnetic disk or optical disk and other media that can store program codes.

Finally, it should be noted that the above embodiments are only used to illustrate the technical solutions of the present disclosure, but not to limit them; although the present disclosure has been described in detail with reference to the foregoing embodiments, those of ordinary skill in the art should understand that the technical solutions described in the foregoing embodiments can still be modified, or some or all of the technical features thereof can be equivalently replaced; and these modifications or replacements do not make the essence of the corresponding technical solutions deviate from the scope of technical solutions of the embodiments of the present disclosure. It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. An audio playing method, comprising,
recognizing an audio file to be played as a text file containing sentence segmentation symbols;
generating respective sentence segmentation tags at positions corresponding to the sentence segmentation symbols in the audio file, according to a correspondence relationship between the audio file and the text file;
in response to a return operation during an audio playing process, determining a target play point according to a current play position of the audio file and respective positions of the sentence segmentation tags, wherein the target play point is a starting point of a part in the audio file to be played repeatedly, and the current play position is a position where a frame of the audio file is currently played during the audio playing process; and
playing the audio file from the target play point;
wherein the in response to the return operation during the audio playing process, determining the target play point according to the current play position of the audio file and the respective positions of the sentence segmentation tags comprises:
determining, according to a character interval between a text character corresponding to the current play position of the audio file and a preceding sentence segmentation symbol adjacent to the text character corresponding to the current play position of the audio file, the target play point from which the audio file is played repeatedly; or
determining, according to a time interval between a play time of the current play position of the audio file and a play time of a preceding sentence segmentation tag adjacent to the current play position of the audio file, the target play point from which the audio file is played repeatedly.

2. The method according to claim 1, wherein the recognizing the audio file to be played as the text file containing the sentence segmentation symbols comprises:

recognizing the audio file to be played as the text file, dividing the text file into a plurality of sub-text files with a sentence as a unit by using a preset sentence model, and marking a sentence segmentation symbol at end of each of the sub-text files to generate the text file containing the sentence segmentation symbols.

3. The method according to claim 2, wherein the sentence model constructs training samples by feature attributes of vocabulary, and the sentence model is obtained by training through a conditional random field (CRF) algorithm.

4. The method according to claim 1, wherein the correspondence relationship between the audio file and the text file comprises a corresponding relationship established between the audio file and recognized characters of the text file on time axis in a process of recognizing the audio file to be played as the text file containing the sentence segmentation symbols.

5. The method according to claim 1, wherein the in response to the return operation, determining the target play point according to the current play position of the audio file and respective positions of the sentence segmentation tags comprises:

in response to the return operation, finding the preceding sentence segmentation tag adjacent to the current play position of the audio file; and determining a position of the preceding sentence segmentation tag in the audio file as the target play point.

6. The method according to claim 1, wherein the sentence segmentation symbols comprise a first sentence segmentation symbol and a second sentence segmentation symbol;

wherein the in response to the return operation, determining the target play point according to the current play position of the audio file and the respective positions of the sentence segmentation tags comprises:

in response to the return operation, determining the text character corresponding to the current play position in the text file according to the correspondence relationship between the audio file and the text file;

determining whether a character interval between the text character and the first sentence segmentation symbol is greater than a preset character interval;

in response to determining the character interval between the text character and the first sentence segmentation symbol is greater than the preset character interval, determining a play position of a sentence segmentation tag corresponding to the first sentence segmentation symbol on time axis as the target play point; and in response to determining the character interval between the text character and the first sentence segmentation symbol is less than or equal to the preset character interval, determining a play position of a sentence segmentation tag corresponding to the second segmentation symbol on the time axis as the target play point;

wherein, the first sentence segmentation symbol is the preceding sentence segmentation symbol adjacent to the text character in the text file, and the second sentence segmentation symbol is a preceding sentence segmentation symbol adjacent to the first sentence segmentation symbol in the text file.

7. The method according to claim 1, wherein the sentence segmentation tags comprise a first sentence segmentation tag and a second sentence segmentation tag;

wherein the in response to the return operation, determining the target play point according to the current play position of the audio file and the respective positions of the sentence segmentation tags comprises:

in response to the return operation, determining whether a time interval between the play time corresponding to the current play position and a play time corresponding to the first sentence segmentation tag is greater than a preset time interval;

in response to determining the time interval between the play time corresponding to the current play position and the play time corresponding to the first sentence segmentation tag is greater than the preset time interval, determining a play position of the first sentence segmentation tag on time axis as the target play point; and in response to determining the time interval between the play time corresponding to the current play position and the play time corresponding to the first sentence segmentation tag is less than or equal to the preset time interval, determining a play position of the second sentence segmentation tag on the time axis as the target play point;

wherein, the first sentence segmentation tag is the preceding sentence segmentation tag adjacent to the current play position in the audio file, and the second sentence segmentation tag is a preceding sentence segmentation tag adjacent to the first sentence segmentation tag in the audio file.

8. The method according to claim 5, further comprising:

in response to determining that the preceding sentence segmentation tag is not found at the current play position of the audio file, playing the audio file to be played from a beginning.

9. The method according to claim 1, wherein the sentence segmentation symbol is a comma, a period or a semicolon.

10. An audio playing method, wherein, in response to a trigger operation, detecting whether a speech rate of an audio file to be played is less than a preset speech rate;

in response to detecting that the speech rate of the audio file to be played is less than the preset speech rate, recognizing the audio file to be played as a text file containing sentence segmentation symbols;

generating respective sentence segmentation tags at positions corresponding to the sentence segmentation symbols in the audio file, according to a correspondence relationship between the audio file and the text file;

in response to detecting that the speech rate of the audio file to be played is greater than or equal to the preset speech rate, generating a corresponding sentence segmentation tag in the audio file according to an audio pause duration;

in response to a return operation during an audio playing process, determining a target play point according to a current play position of the audio file and respective positions of the sentence segmentation tags, wherein the target play point is a starting point of a part in the audio file to be played repeatedly, and the current play position is a position where a frame of the audio file is currently played during the audio playing process; and playing the audio file from the target play point;

wherein the in response to the return operation during the audio playing process, determining the target play point according to the current play position of the audio file and the respective positions of the sentence segmentation tags comprises:

determining, according to a character interval between a text character corresponding to the current play position of the audio file and a preceding sentence segmentation symbol adjacent to the text character corresponding to the current play position of the audio file, the target play point from which the audio file is played repeatedly; or determining, according to a time interval between a play time of the current play position of the audio file and a play time of a preceding sentence segmentation tag adjacent to the current play position of the audio file, the target play point from which the audio file is played repeatedly.

11. The method according to claim 10, wherein the recognizing the audio file to be played as the text file containing the sentence segmentation symbols comprises:

recognizing the audio file to be played as the text file, dividing the text file into a plurality of sub-text files with a sentence as a unit by using a preset sentence model, and marking a sentence segmentation symbol at end of each of the sub-text files to generate the text file containing the sentence segmentation symbols.

12. The method according to claim 11, wherein the sentence model constructs training samples by feature attributes of vocabulary, and the sentence model is obtained by training through a CRF algorithm.

13. The method according to claim 10, wherein the correspondence relationship between the audio file and the text file comprises a corresponding relationship established between the audio file and recognized characters of the text file on time axis in a process of recognizing the audio file to be played as the text file containing the sentence segmentation symbols.

14. The method according to claim 10, wherein the in response to the return operation, determining the target play point according to the current play position of the audio file and respective positions of the sentence segmentation tags comprises:

in response to the return operation, finding the preceding sentence segmentation tag adjacent to the current play position of the audio file; and determining a position of the preceding sentence segmentation tag in the audio file as the target play point.

15. The method according to claim 10, wherein the sentence segmentation symbols comprise a first sentence segmentation symbol and a second sentence segmentation symbol;

wherein the in response to the return operation, determining the target play point according to the current play position of the audio file and the respective positions of the sentence segmentation tags comprises:
in response to the return operation, determining the text character corresponding to the current play position in the text file according to the correspondence relationship between the audio file and the text file;
determining whether a character interval between the text character and the first sentence segmentation symbol is greater than a preset character interval;
in response to determining the character interval between the text character and the first sentence segmentation symbol is greater than the preset character interval, determining a play position of a sentence segmentation tag corresponding to the first sentence segmentation symbol on time axis as the target play point; and
in response to determining the character interval between the text character and the first sentence segmentation symbol is less than or equal to the preset character interval, determining a play position of a sentence segmentation tag corresponding to the second segmentation symbol on the time axis as the target play point;
wherein, the first sentence segmentation symbol is the preceding sentence segmentation symbol adjacent to the text character in the text file, and the second sentence segmentation symbol is a preceding sentence segmentation symbol adjacent to the first sentence segmentation symbol in the text file.

16. The method according to claim 10, wherein the sentence segmentation tags comprise a first sentence segmentation tag and a second sentence segmentation tag;

wherein the in response to the return operation, determining the target play point according to the current play position of the audio file and the respective positions of the sentence segmentation tags comprises:
in response to the return operation, determining whether a time interval between the play time corresponding to the current play position and a play time corresponding to the first sentence segmentation tag is greater than a preset time interval;
in response to determining the time interval between the play time corresponding to the current play position and the play time corresponding to the first sentence segmentation tag is greater than the preset time interval, determining a play position of the first sentence segmentation tag on time axis as the target play point; and
in response to determining the time interval between the play time corresponding to the current play position and the play time corresponding to the first sentence segmentation tag is less than or equal to the preset time interval, determining a play position of the second sentence segmentation tag on the time axis as the target play point;
wherein, the first sentence segmentation tag is the preceding sentence segmentation tag adjacent to the current play position in the audio file, and the second sentence segmentation tag is a preceding sentence segmentation tag adjacent to the first sentence segmentation tag in the audio file.

17. The method according to claim 14, further comprising:

in response to determining that the preceding sentence segmentation tag is not found at the current play position of the audio file, playing the audio file to be played from a beginning.

18. The method according to claim 10, wherein the generating the corresponding sentence segmentation tag in the audio file according to the audio pause duration comprises:

in response to detecting that the audio pause duration is greater than a preset duration, generating the corresponding sentence segmentation tag in the audio file.

19. An electronic device, comprising:

a processor;
memory for storing instructions executable by the processor;
wherein the processor is configured to:
recognize an audio file to be played as a text file containing sentence segmentation symbols;
generate respective sentence segmentation tags at positions corresponding to the sentence segmentation symbols in the audio file, according to a correspondence relationship between the audio file and the text file;
in response to a return operation during an audio playing process, determine a target play point according to a current play position of the audio file and respective positions of the sentence segmentation tags, wherein the target play point is a starting point of a part in the audio file to be played repeatedly, and the current play position is a position where a frame of the audio file is currently played during the audio playing process; and play the audio file from the target play point;

wherein the processor is specifically configured to:

determine, according to a character interval between a text character corresponding to the current play position of the audio file and a preceding sentence segmentation symbol adjacent to the text character corresponding to the current play position of the audio file, the target play point from which the audio file is played repeatedly; or determine, according to a time interval between a play time of the current play position of the audio file and a play time of a preceding sentence segmentation tag adjacent to the current play position of the audio file, the target play point from which the audio file is played repeatedly.

20. A non-transitory computer-readable storage medium with a computer program stored thereon, wherein when the computer program is executed by a processor, the processor implements the audio playing method according to claim 1.

* * * * *